(12) United States Patent
Griffin et al.

(10) Patent No.: US 7,733,330 B2
(45) Date of Patent: Jun. 8, 2010

(54) MOBILE DEVICE KEYBOARD HAVING THREE-DIRECTION KEYS

(75) Inventors: Jason T. Griffin, Kitchener (CA); Roman Peter Rak, Waterloo (CA); Mihal Lazaridis, Waterloo (CA)

(73) Assignee: Research in Motion Limited, Waterloo (CA)

( * ) Notice: Subject to any disclaimer, the term of this patent is extended or adjusted under 35 U.S.C. 154(b) by 925 days.

(21) Appl. No.: 11/199,542

(22) Filed: Aug. 8, 2005

(65) Prior Publication Data

US 2007/0030249 A1    Feb. 8, 2007

(51) Int. Cl.
*G06F 3/02*   (2006.01)
*H03K 11/00*  (2006.01)

(52) U.S. Cl. ........................................ 345/169; 341/22

(58) Field of Classification Search ................. 345/169, 345/168; 455/575, 564; 400/480–487; 341/20–29
See application file for complete search history.

(56) References Cited

U.S. PATENT DOCUMENTS

| | | | |
|---|---|---|---|
| 5,852,414 A | 12/1998 | Yu et al. | |
| 6,288,709 B1 * | 9/2001 | Willner et al. | 345/169 |
| 6,310,608 B1 * | 10/2001 | Kaply et al. | 345/168 |
| 6,459,060 B1 | 10/2002 | Bartok | |
| 7,048,456 B2 * | 5/2006 | Keinonen et al. | 400/480 |
| 2001/0006587 A1 | 7/2001 | Keinonen et al. | |
| 2002/0044136 A1 * | 4/2002 | Griffin et al. | 345/169 |
| 2002/0110237 A1 | 8/2002 | Krishnan | |
| 2002/0140679 A1 * | 10/2002 | Wen | 345/169 |
| 2003/0073456 A1 * | 4/2003 | Griffin et al. | 455/575 |
| 2005/0062619 A1 * | 3/2005 | Jellicoe | 341/22 |
| 2005/0168447 A1 * | 8/2005 | Caine et al. | 345/169 |
| 2006/0017697 A1 * | 1/2006 | Rak et al. | 345/168 |
| 2006/0018699 A1 * | 1/2006 | Rak et al. | 400/486 |
| 2006/0146026 A1 * | 7/2006 | Shim | 345/168 |
| 2006/0246954 A1 * | 11/2006 | Rak et al. | 455/564 |

OTHER PUBLICATIONS

EPO: Summons to attend oral proceedings pursuant to Rule 115(1) EPC issued May 13, 2009 in EP Application No. 05017251.9 (6 pages).

* cited by examiner

*Primary Examiner*—Chanh Nguyen
*Assistant Examiner*—Adam J Snyder
(74) *Attorney, Agent, or Firm*—Jones Day; Krishna K. Pathiyal; Robert C. Liang (57) ABSTRACT

A keyboard for a mobile device is provided that includes a plurality of three-direction keys. The three-direction keys may include three protruding portions that each correspond to at least one character of the keyboard. At least one of the three-direction keys may be inverted with respect to other ones of the three-direction keys. The three-direction keys may be positioned on the mobile device to provide characters in at least three rows the keyboard.

16 Claims, 7 Drawing Sheets

MOBILE DEVICE KEYBOARD HAVING THREE-DIRECTION KEYS

FIELD

The technology described in this patent document relates generally to the field of input systems for electronic devices. More particularly, the patent document describes a keyboard having three-direction keys that is especially well-suited for use in a mobile device, such as a personal digital assistant (PDA), cellular telephone, two-way pager, etc.

BACKGROUND

Mobile devices that include a keyboard for inputting text are known in this field. However, providing a traditional-style keyboard (e.g., a QWERTY-style keyboard) on a small, handheld mobile device typically involves an ergonomic compromise between having smaller keys on a full text-entry keypad or larger keys on a reduced keypad.

DETAILED DESCRIPTION

Figure 1:
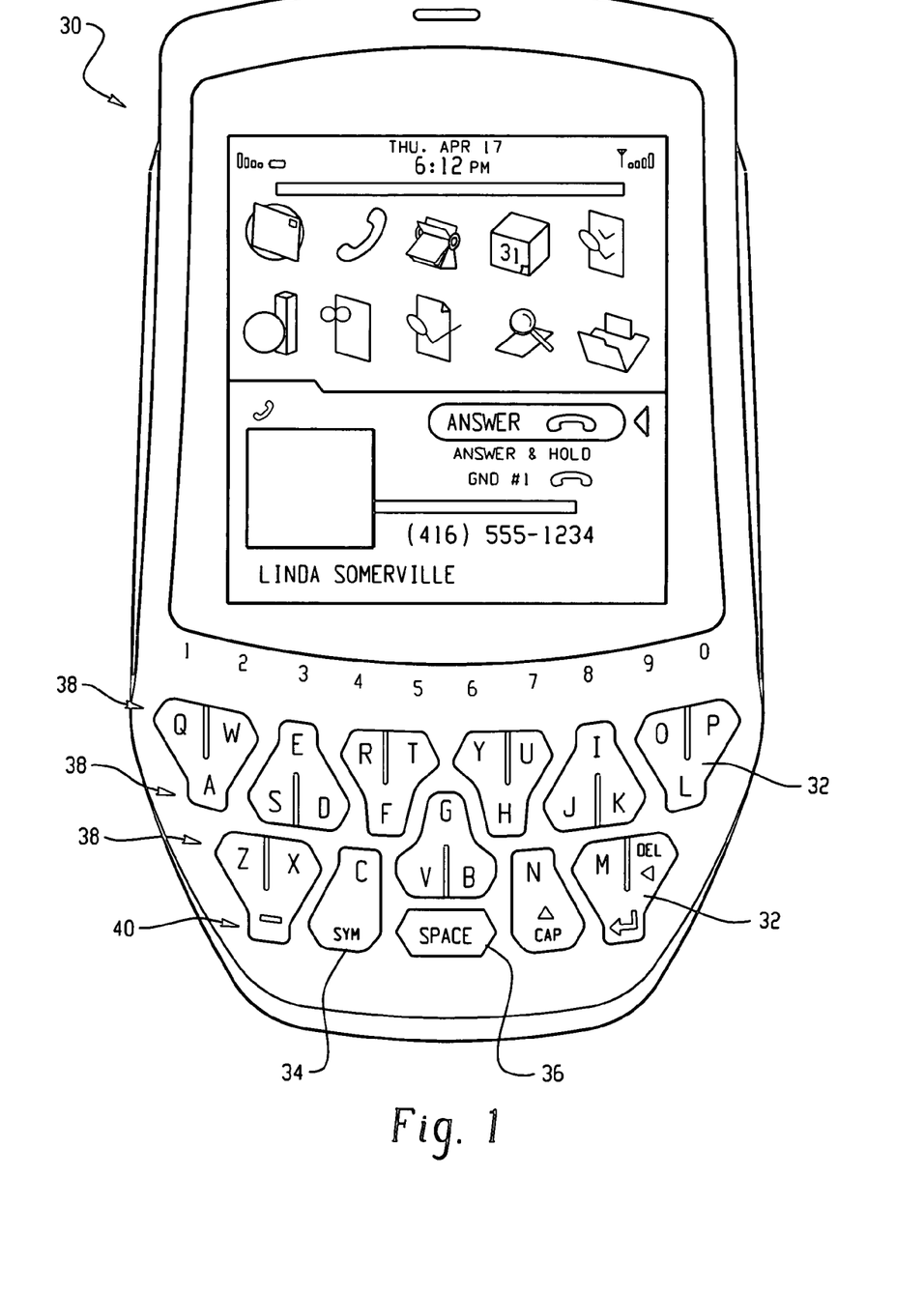
FIG. 1 depicts a mobile device having an example keyboard with three-direction keys.

FIG. 1 depicts a mobile device 30 having an example keyboard with three-direction keys 32. The mobile device keyboard includes a plurality of three-direction keys 32, a pair of two-direction keys 34, and a space key 36. The three-direction keys 32 include three protruding portions, with at least one character printed on each protruding portion. Different key geometries having three protruding portions may be used, for example triangular keys, T-shaped keys, or others. The three-direction keys 32 may be symmetrical or non-symmetrical. In the example of FIG. 1, the three-direction keys 32 are non-symmetrical, and each of the three-direction keys are not identically shaped. In other examples, however, identically-shaped and/or symmetrical keys may be used.

In the illustrated example, a number of the three-direction keys 32 are inverted with respect to other ones of the three-dimension keys 32, and the keys 32 are positioned on the mobile device 30 to provide characters in four rows of the keyboard. More specifically, the three-direction keys 32 and the two-direction keys 34 are interdigitated to form three rows of a QWERTY-style keyboard 38 and a row of functional characters 40 (e.g., carriage return, shift, alt., etc.). The space key 34 is positioned in the row of functional characters 40 between the bottom portions of the two-direction keys 34. As illustrated, arranging certain ones of the three-direction keys in an inverted position enables the keys 32 to be interdigitated or nested to form a compact key pattern that tapers towards the bottom of the mobile device 30.

The characters in the rows of the QWERTY-style keyboard 38 include the letters of the alphabet and may also include one or more numbers and/or one or more function characters. In the illustrated example, each key portion in the upper row of the QWERTY-style keyboard is associated with both a letter and a number, with the letter being printed on the key and the number being printed above the key. In other examples, alternate characters (e.g., parentheses, quotation marks, period, comma, etc.) may also be included on or alongside one or more of the keys.

In operation, the keys are preferably used to activate one key switch for each character printed on the key, depending on which portion of the key is pressed. The three-direction keys 32 are operable to activate three key switches, the two-direction keys 34 are operable to activate two key switches, and the single-direction key 36 is operable to activate one key switch. The keys may also be textured to help enable the device user to press the correct portion of the key to active the key switch corresponding to a desired character. To activate a desired key switch, the device user may press the three-character key 32 slightly off center and in the direction of the desired character. The two key switches of the three-direction switch opposite the desired character should have enough spring force to hold the opposite side of the key up while the desired key switch is pressed. In addition, timing circuitry or software may be used to cause the device to ignore a key switch contact that is inadvertently made following a desired key switch contact on one of the other two portions of the three-character key 32. That is, if two or more key switches on the same three-direction key 32 are activated at substantially the same time, then the device may be configured to apply only the key switch that is activated first.

Figure 2:
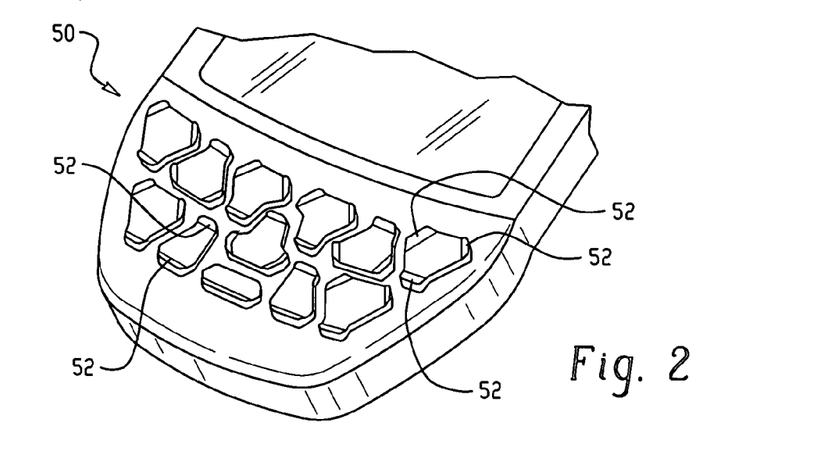
FIGS. 2-4 depict example surface textures for a keyboard with three-direction keys.
Figure 3:
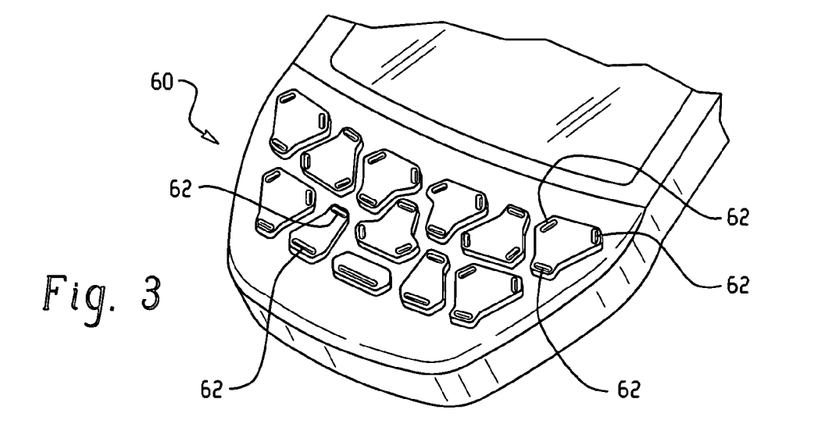
Figure 4:
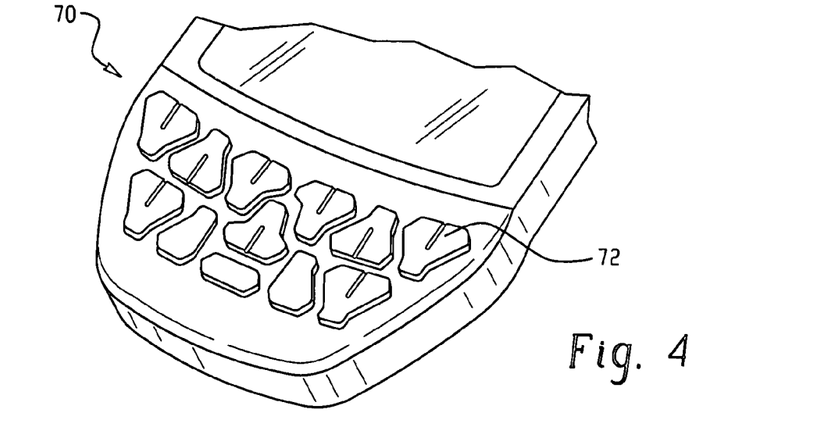

FIGS. 2-4 depict example surface textures for a keyboard with three-direction keys. FIG. 2 illustrates an example keyboard 50 in which the keys include a raised surface 52 along an edge of each protruding portion of the key. FIG. 3 illustrates an keyboard 60 in which the keys include another example type of raised surface 62 on each protruding portion of the key. The textured surfaces 52, 62 illustrated in FIGS. 2 and 3 enable a device user to distinguish between the protruding portions of the key by touch. FIG. 4 illustrates an example keyboard 70 in which the three-direction keys include another example textured surface 72. In the example of FIG. 4, the textured surface 72 enables the device user to visually distinguish the three protruding portions of the key.

Figure 5:
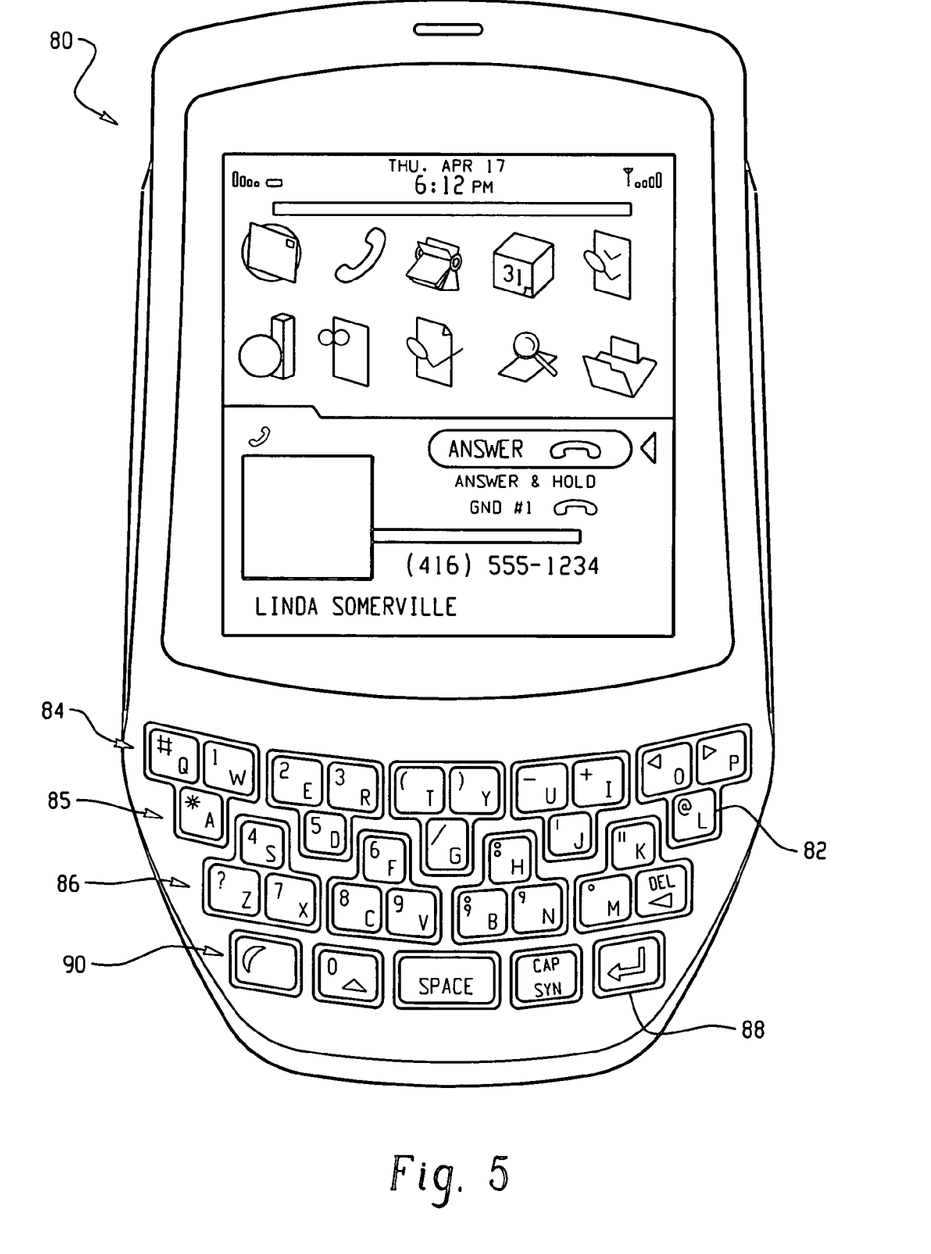
FIG. 5 depicts a mobile device having an example keyboard with T-shaped three-direction keys.

FIG. 5 depicts a mobile device 80 having another example keyboard with three-direction keys 82. The keyboard in this example 80 includes a plurality of T-shaped three-direction keys 82 that are arranged to provide three rows 84-86 of the keyboard, and a plurality of single-direction keys 84 that are arranged to provide a fourth row 90 of the keyboard. The first three rows 84-86 of the keyboard are formed by two rows of three-direction keys 82, with the second row of three-direction keys being inverted with respect to the first row of three-direction keys. The two rows of three-directions keys 82 are interdigitated such that one protruding portion of each three-direction key 82 aligns to form the second row 85 of the keyboard.

Each protruding portion of the three-direction keys 82 in this example is associated with one letter or functional character (e.g., backspace) and one number or alternate character (e.g., parentheses, quotation marks, period, comma, etc.), which are printed on the keys. That is, two characters are printed on each protruding portion of the three-direction keys 82. In addition, the number characters are printed on the keyboard in an arrangement typical to a telephone keypad. It should be understood, however, that different character arrangements may be printed on or alongside one or more of the keys.

Figure 6:
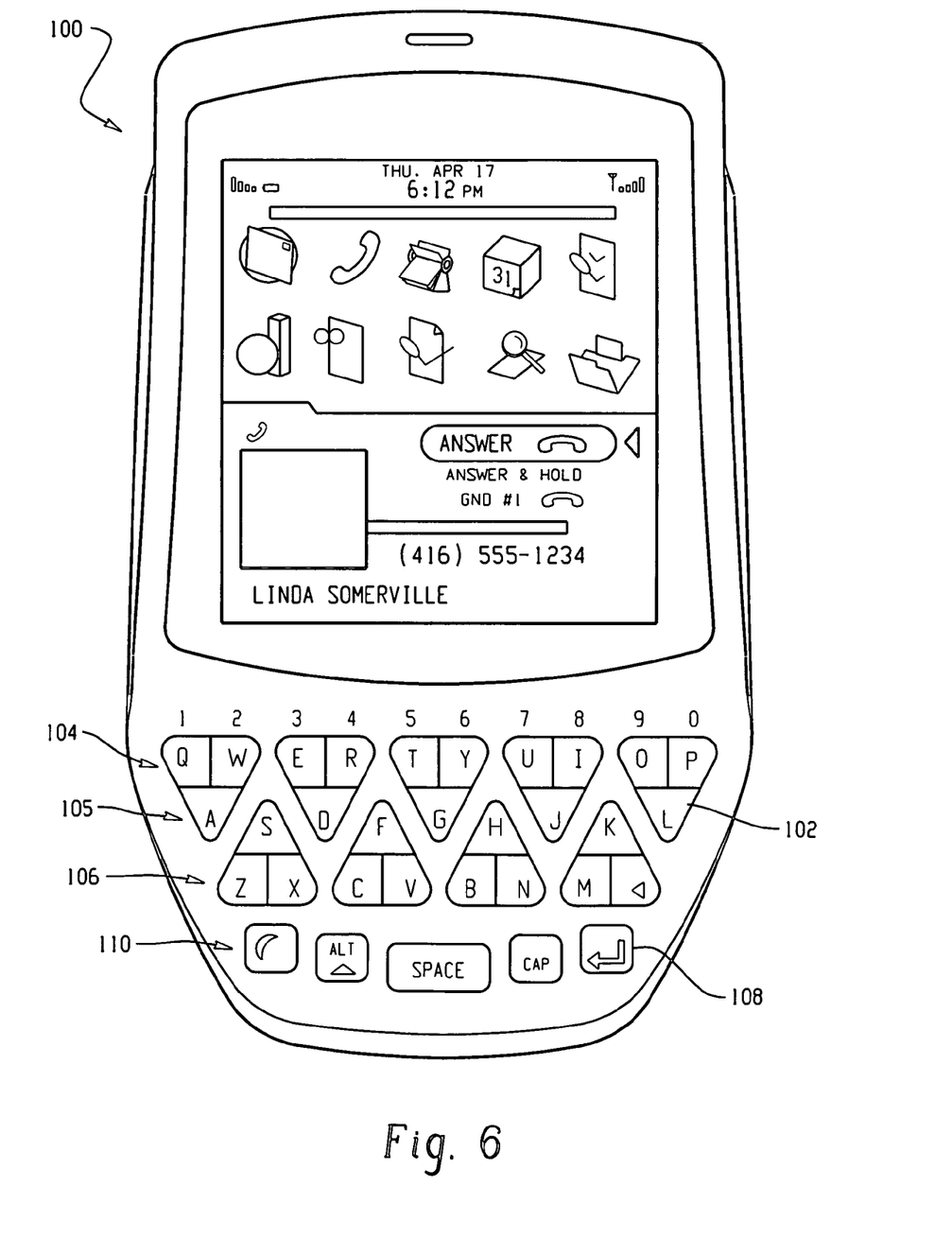
FIG. 6 depicts a mobile device having an example keyboard with triangular-shaped three-direction keys.

FIG. 6 depicts a mobile device 100 having another example keyboard with three-direction keys 102. The keyboard in this example 100 includes a plurality of triangular three-direction keys 102 that are arranged to provide three rows 104-106 of the keyboard, and a plurality of single-direction keys 108 that are arranged to provide a fourth row 110 of the keyboard. The first three rows 104-106 of the keyboard are formed by two rows of three-direction keys 102, with the second row of three-direction keys being inverted with respect to the first row of three-direction keys. The two rows of three-directions keys 102 are interdigitated such that one protruding portion of each three-direction key 102 aligns to form the second row 105 of the keyboard.

In this example, each of the key portions in the upper row 104 of the keyboard are associated with both a letter and a number, with the letter being printed on the key and the number being printed above the key. In other examples, alternate characters (e.g., parentheses, quotation marks, period, comma, etc.) may also be included on or alongside one or more of the keys.

Figure 7:
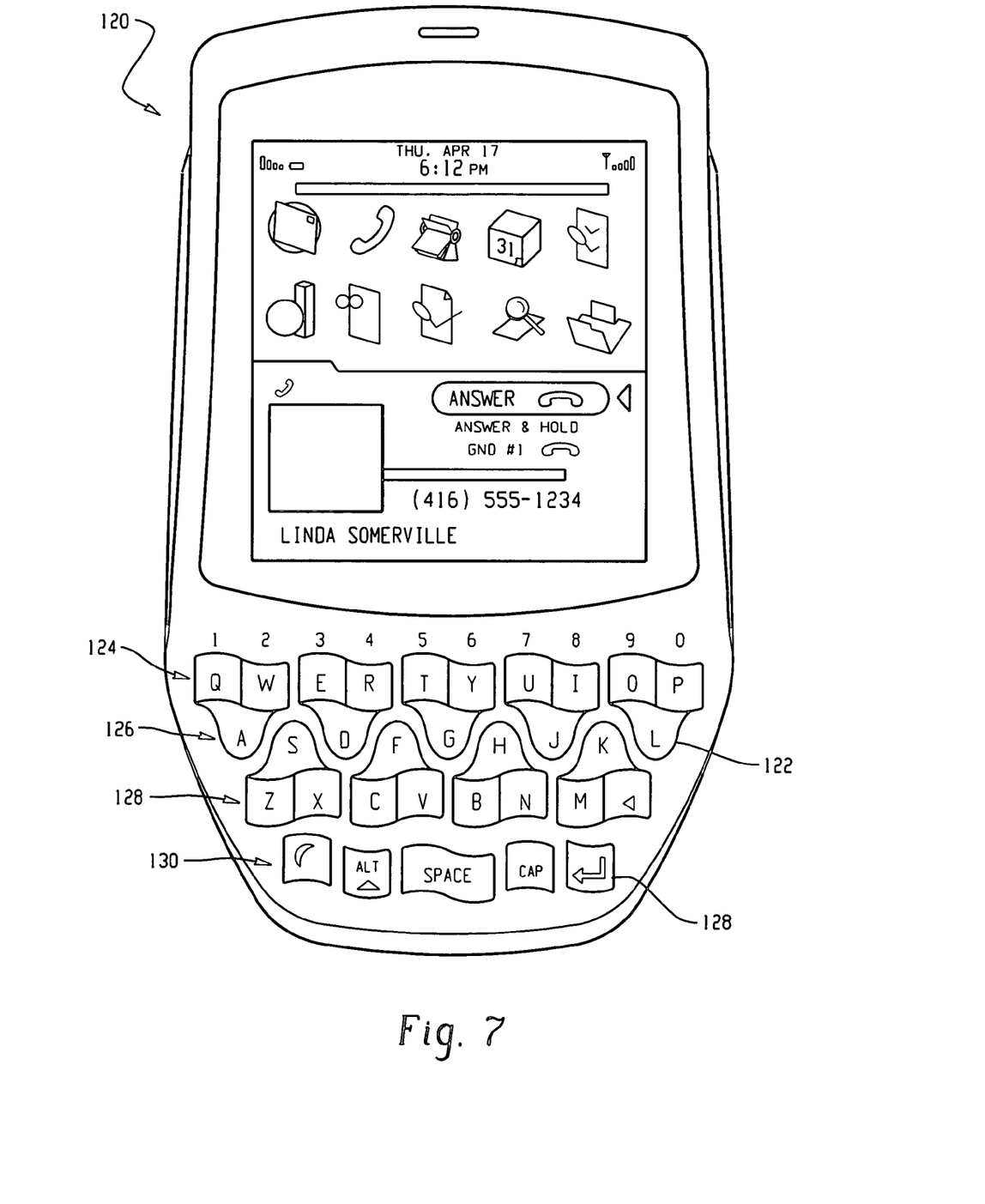
FIG. 7 depicts a mobile device having another example keyboard with-three-direction keys.

FIG. 7 depicts a mobile device 120 having another example keyboard with three-direction keys 122. The keyboard in this example 120 includes a plurality of sinusoid-shaped three-direction keys 122 that are arranged to provide three rows 124-126 of the keyboard, and a plurality of single-direction keys 128 that are arranged to provide a fourth row 130 of the keyboard. The first three rows 124-126 of the keyboard are formed by two rows of three-direction keys 122, with the second row of three-direction keys being inverted with respect to the first row of three-direction keys. The two rows of three-directions keys 122 are interdigitated such that one protruding portion of each three-direction key 122 aligns to form the second row 125 of the keyboard. In this example, the spacing between the interdigitated keys forms a sine wave as a result of the sinusoidal shape of the keys.

In this example, each key portions in the upper row 124 of the keyboard are associated with both a letter and a number, with the letter being printed on the key and the number being printed above the key. In other examples, alternate characters (e.g., parentheses, quotation marks, period, comma, etc.) may also be included on or alongside one or more of the keys.

Figure 8:
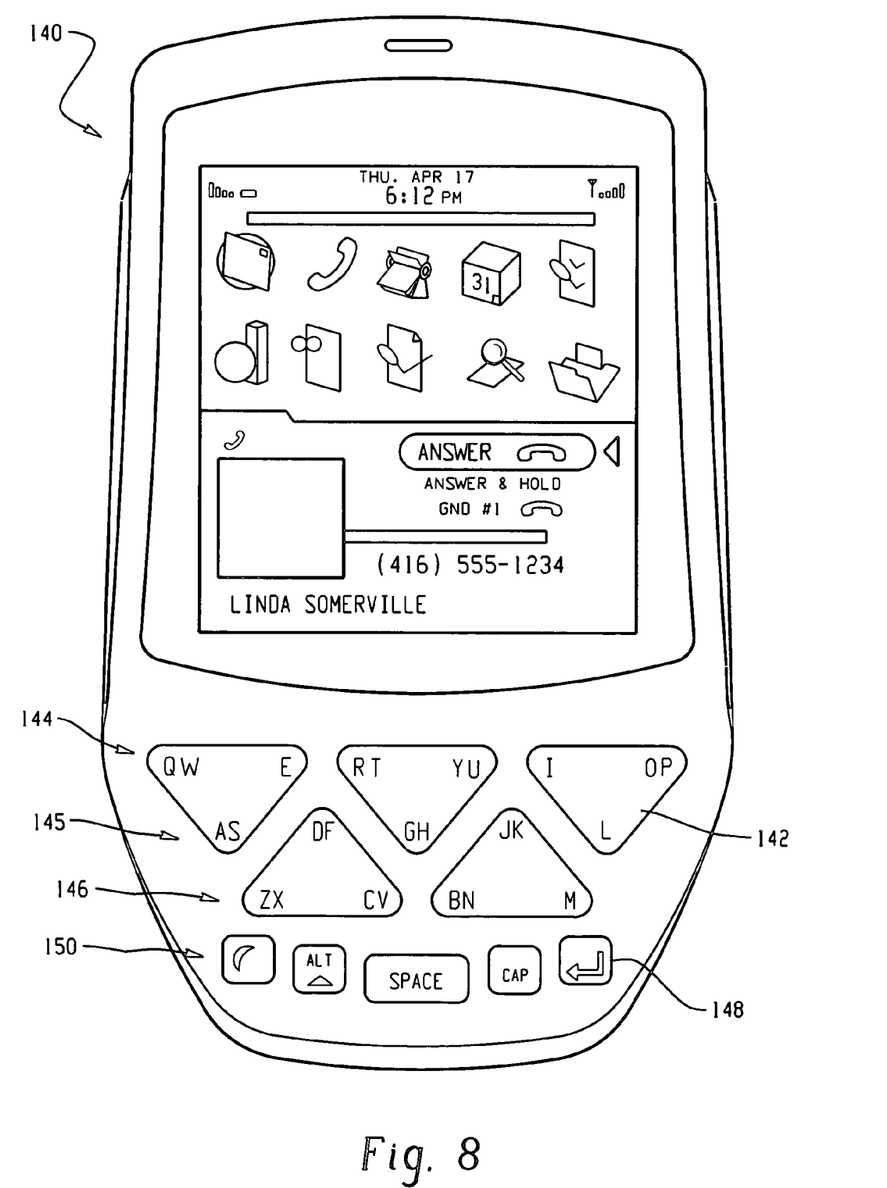
FIG. 8 depicts an example mobile device having a reduced QWERTY-style keyboard with three-direction keys.

FIG. 8 depicts an example mobile device 140 having a reduced QWERTY-style keyboard with three-direction keys 142. The example keyboard includes a plurality of three-direction keys 142 that are arranged to provide three rows 144-146 of the keyboard, and a plurality of single-direction keys 148 that are arranged to provide a fourth row 150 of the keyboard. The first three rows 144-146 of the keyboard are formed by two rows of three-direction keys 142, with the second row of three-direction keys being inverted with respect to the first row of three-direction keys. The two rows of three-directions keys 142 are interdigitated such that one protruding portion of each three-direction key 142 aligns to form the second row 145 of the keyboard.

In addition, the three-direction keys 142 in this example may include more than one letter character printed on the same portion the key, thus reducing the total number of keys in the keyboard. In order to determine which character is desired when a key portion is pressed, the mobile device 140 may include a predictive text application, such as described in commonly-owned U.S. patent application Ser. No. 10/783,901, filed on Feb. 20, 2004 and entitled "Predictive Text Input System for a Mobile Communication Device," which is incorporated herein by reference.

Figure 9:
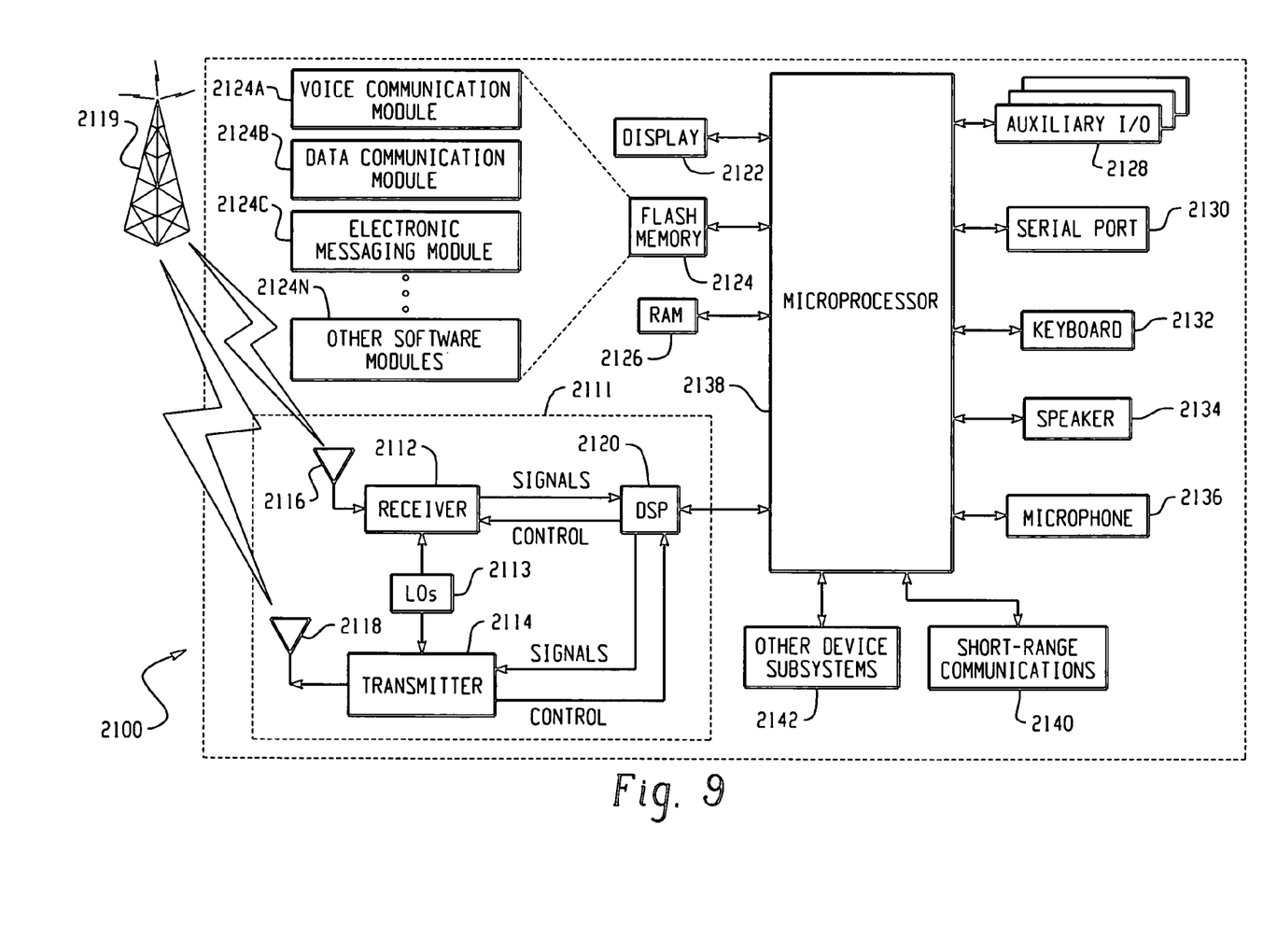
FIG. 9 is a block diagram illustrating an example mobile device, which may include a keyboard with three-direction keys.

FIG. 9 is a block diagram illustrating an example mobile device 2100, which may include a keyboard with three-direction keys as described herein. The mobile device 2100 includes a processing subsystem 2138, a communications subsystem 2111, a short-range communications subsystem 2140, a memory subsystem 2124, 2126, and various other device subsystems and/or software modules 2142. The mobile device 2100 also includes a user interface, which may include a display 2122, a serial port 2130, a keyboard 2132, a speaker 2134, a microphone 2136, one or more auxiliary input/output devices 2128, and/or other user interface devices.

The processing subsystem 2138 controls the overall operation of the mobile device 2100. Operating system software executed by the processing subsystem 2138 may be stored in a persistent store, such as a flash memory 2124, but may also be stored in other types of memory devices in the memory subsystem, such as a read only memory (ROM) or similar storage element. In addition, system software, specific device applications, or parts thereof, may be temporarily loaded into a volatile store, such as a random access memory (RAM) 2126. Communication signals received by the mobile device 2100 may also be stored to RAM 2126.

The processing subsystem 2138, in addition to its operating system functions, enables execution of software applications 2124 on the device 2100. A predetermined set of applications that control basic device operations, such as data and voice communications, may be installed on the device 2100 during manufacture. In addition, a personal information manager (PIM) application, including an electronic messaging application, may be installed on the device. The PIM may, for example, be operable to organize and manage data items, such as e-mail, calendar events, voice mails, appointments, and task items. The PIM application may also be operable to send and receive data items via the wireless network 2119.

Communication functions, including data and voice communications, are performed through the communication subsystem 2111, and possibly through the short-range communications subsystem 2140. The communication subsystem 2111 includes a receiver 2112, a transmitter 2114 and one or more antennas 2116, 2118. In addition, the communication subsystem 2111 also includes a processing module, such as a digital signal processor (DSP) 2120 or other processing device(s), and local oscillators (LOs) 2113. The specific design and implementation of the communication subsystem 2111 is dependent upon the communication network in which the mobile device 2100 is intended to operate. For example, a mobile device 2100 may include a communication subsystem 2111 designed to operate within the Mobitex™ mobile communication system, the DataTAC™ mobile communication system, a GSM network, a GPRS network, a UMTS network, and/or an EDGE network.

Network access requirements vary depending upon the type of communication system. For example, in the Mobitex and DataTAC networks, mobile devices are registered on the network using a unique personal identification number or PIN associated with each device. In UMTS and GSM/GPRS networks, however, network access is associated with a subscriber or user of a device. A GPRS device therefore requires a subscriber identity module, commonly referred to as a SIM card, in order to operate on a GSM/GPRS network.

When required network registration or activation procedures have been completed, the mobile device 2100 may send and receive communication signals over the communication network 2119. Signals received by the antenna 2116 from the communication network 2119 are routed to the receiver 2112, which provides signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 2119 are processed (e.g., modulated and encoded) by the DSP 2120 and are then provided to the transmitter 2114 for digital to analog conversion, frequency up conversion, filtering, amplification and transmission to the communication network 2119 (or networks) via the antenna 2118.

In addition to processing communication signals, the DSP 2120 provides for receiver 2112 and transmitter 2114 control. For example, gains applied to communication signals in the receiver 2112 and transmitter 2114 may be adaptively controlled through automatic gain control algorithms implemented in the DSP 2120.

In a data communication mode, a received signal, such as a text message or web page download, is processed by the communication subsystem 2111 and input to the processing device 2138. The received signal is then further processed by the processing device 2138 for output to a display 2122, or alternatively to some other auxiliary I/O device 2128. A device user may also compose data items, such as e-mail messages, using a keyboard 2138 and/or some other auxiliary I/O device 2128, such as a touchpad, a rocker switch, a thumb-wheel, or some other type of input device. The composed data items may then be transmitted over the communication network 2119 via the communication subsystem 2111.

In a voice communication mode, overall operation of the device is substantially similar to the data communication mode, except that received signals are output to a speaker 2134, and signals for transmission are generated by a microphone 2136. Alternative voice or audio I/O subsystems, such as a voice message recording subsystem, may also be implemented on the device 2100. In addition, the display 2122 may also be utilized in voice communication mode, for example, to display the identity of a calling party, the duration of a voice call, or other voice call related information.

The short-range communications subsystem 2140 enables communication between the mobile device 2100 and other proximate systems or devices, which need not necessarily be similar devices. For example, the short-range communications subsystem 2140 may include an infrared device and associated circuits and components, or a Bluetooth™ communication module to provide for communication with similarly-enabled systems and devices.

This written description uses examples to disclose the invention, including the best mode, and also to enable a person skilled in the art to make and use the invention. The patentable scope of the invention may include other examples that occur to those skilled in the art. For instance, in one alternative example, the keys of the keyboard may be displayed on a touchscreen, and the characters may be activated by touching a portion of the displayed key associated with the desired character.

It is claimed:

1. A mobile device comprising:
    a plurality of three-direction keys, including an upper row of keys and a lower row of keys, the upper row including first, second and third keys that each include left and right upper end portions and a lower end portion, and the lower row of keys including fourth and fifth keys that each include an upper end portion and left and right lower end portions;
    each end portion being marked with at least one letter, the letters appearing on the end portions in a QWERTY sequence, with the letters Q and W appearing together on the first key's left upper end portion, the letter E appearing alone on the first key's right upper end portion, the letters R and T appearing together on the second key's left end portion, the letters Y and U appearing together on the second key's right upper end portion, the letter I appearing alone on the third key's left upper end portion, the letters 0 and P appearing together on the third key's right upper end portion, the letters A and S appearing together on the first key's lower end portion, the letters D and F appearing together on the fourth key's upper end portion, the letters G and H appearing together on the second key's lower end portion, the letters J and K appearing together on the fifth key's upper end portion, the letter L appearing alone on the third key's lower end portion, the letters Z and X appearing together on the fourth key's left lower end portion, the letters C and V appearing together on the fourth key's right lower end portion, the letters B and N appearing together on the fifth key's left lower end portion, and the letter M appearing alone on the fifth key's right lower end portion.

2. The mobile device of claim 1, wherein the at least one inverted three-direction key is interdigitated with other ones of the three-direction keys.

3. The mobile device of claim 1, wherein one or more of the plurality of three-direction keys are triangular-shaped.

4. The mobile device of claim 1, wherein one or more of the plurality of three-direction keys are T-shaped.

5. The mobile device of claim 1, wherein a housing of the mobile device is tapered between a top row of the plurality of three-direction keys and a bottom row of the plurality of three-direction keys.

6. The mobile device of claim 1, the plurality of three-direction keys further comprising:
    at least one two-direction key that is positioned on the mobile device to provide characters in at least two rows of the plurality of three-direction keys.

7. The mobile device of claim 1, the keyboard plurality of three-direction keys further comprising:
    at least one single-direction key.

8. The mobile device of claim 1, wherein at least one of the three-direction keys is symmetrical.

9. The mobile device of claim 1, wherein at least one of the three-direction keys is non-symmetrical.

10. The mobile device of claim 1, wherein each of the three-direction keys is shaped substantially identically.

11. The mobile device of claim 1, wherein at least two of the three-direction keys are differently-shaped.

12. The mobile device of claim 1 wherein each key includes a textured surface that enables tactilely distinguishing between the key's three end portions.

13. The mobile device of claim 12 wherein the textured surface is configured to enable visually distinguishing between the key's three end portions.

14. The mobile device of claim 1 further comprising:

a predictive text application in signal communication with keys, configured to predict, for each end portion that is imprinted with more than one letter, which letter is intended when that end portion is pressed during text input.

15. The mobile device of claim 1 further comprising an upward protrusion at each end portion for a finger to sense the location of the finger-press location.

16. The mobile device of claim 1 wherein each protrusion is shaped and/or oriented differently from the key's other two protrusions to enable a user to tactilely distinguish between the key's three end portions.

* * * * *

UNITED STATES PATENT AND TRADEMARK OFFICE
CERTIFICATE OF CORRECTION

| | | |
|---|---|---|
| PATENT NO. | : 7,733,330 B2 | Page 1 of 1 |
| APPLICATION NO. | : 11/199542 | |
| DATED | : June 8, 2010 | |
| INVENTOR(S) | : Griffin et al. | |

It is certified that error appears in the above-identified patent and that said Letters Patent is hereby corrected as shown below:

Column 6, line 25, please replace "letters 0 and P" with -- letters O and P --

Column 6, line 58, please replace "the keyboard plurality" with -- the plurality --

Signed and Sealed this

Tenth Day of August, 2010

David J. Kappos
*Director of the United States Patent and Trademark Office*